United States Patent [19]
Ramsland

[11] Patent Number: 5,411,640
[45] Date of Patent: * May 2, 1995

[54] CENTRIFUGAL DISTILLATION APPARATUS

[76] Inventor: Arnold Ramsland, 121 S. Kingman Rd., South Orange, N.J. 07079

[ * ] Notice: The portion of the term of this patent subsequent to Sep. 3, 2008 has been disclaimed.

[21] Appl. No.: 789,403

[22] Filed: Nov. 1, 1991

Related U.S. Application Data

[63] Continuation-in-part of Ser. No. 612,120, Nov. 9, 1990, abandoned.

[51] Int. Cl.⁶ .............................................. B01D 1/22
[52] U.S. Cl. ................... 202/174; 159/6.1; 159/18; 202/176; 202/178; 202/236; 203/25; 203/72; 203/89
[58] Field of Search ............... 202/236, 174, 178, 176; 203/72, 89, 25; 159/18, 6.1

[56] References Cited

U.S. PATENT DOCUMENTS

| | | | |
|---|---|---|---|
| 845,929 | 3/1907 | Broonoippolito | 202/178 |
| 2,894,879 | 7/1959 | Hickman | 202/174 |
| 2,999,796 | 9/1961 | Bromley | 202/236 |
| 3,136,707 | 6/1964 | Hickman | 202/236 |
| 3,291,704 | 12/1966 | Dierdrich et al. | 202/236 |
| 3,536,591 | 10/1970 | Lotz | 202/236 |
| 3,837,491 | 9/1974 | Humiston et al. | 202/236 |
| 4,451,334 | 5/1984 | Ciocca et al. | 202/174 |
| 4,731,159 | 3/1988 | Porter | 159/6.1 |
| 5,045,155 | 9/1991 | Ramsland | 202/236 |

Primary Examiner—Peter A. Hruskoci
Attorney, Agent, or Firm—Richard T. Laughlin

[57] ABSTRACT

The disclosed invention is an apparatus for the distillation of liquids. The apparatus has a plurality of vertically-stacked, parallel disks which are rotated. The liquid to be distilled is introduced into the center of the disk stack and migrates by centrifugal force as a thin film across side 1 of each disk. During migration, the more volatile portion evaporates from side 1 and condenses on side 2 of a neighboring disk. Energy requirements for distillation are provided by heat transfer from side 2 to side 1. The apparatus is substantially adiabatic in that vaporization and condensation occur without external supply of heating or cooling.

9 Claims, 10 Drawing Sheets

CENTRIFUGAL DISTILLATION APPARATUS

This application is a continuation in part of application Ser. No. 612,120, filed Nov. 9, 1990, now abandoned.

The invention relates to a substantially adiabatic, centrifugal distillation apparatus, and in particular the invention relates to a rotatable distiller which has a plurality stacked distillation chambers formed by a plurality of stacked disks interspersed by inner and outer rings which provide both support for the distiller and selective channeling of liquid through the distiller. The invention is unique in that distillation occurs without external supply of heat or cooling by means of heat transfer from the condensing to the evaporating surfaces of the disks.

BACKGROUND OF THE INVENTION

The prior art distillation apparatus is described in the following U.S. Patent Documents:

| U.S. Pat. No. | Date | Inventor |
| --- | --- | --- |
| 845929 | 3/5/07 | Broonoippolito |
| 2999796 | 2/9/59 | Bromley |
| 3136707 | 6/9/64 | Hickman |
| 3293153 | 12/20/66 | Lustenader |
| 3505175 | 4/7/70 | Zalles |
| 3536591 | 10/27/70 | Lotz |
| 3697383 | 10/10/72 | Weaver |
| 3837491 | 9/24/74 | Humiston |
| 3505175 | 6/17/86 | Kusakawa et al. |
| 4731159 | 3/15/88 | Porter et al. |

The prior art describes various types of stationary and rotary distillation devices. One type of prior art (e.g., Porter) requires heating (usually by steam) to partially vaporize a liquid. One drawback with this prior art apparatus is that a relatively large amount of energy is required to convert liquid to vapor. Another type of prior art (e.g., Bromley) is multi-effect in that some of the energy given off in condensation is used to vaporize additional liquid. The drawback with this type of multi-effect apparatus is that there is a pressure drop with each effect so that there is a limit to the number of effects. Another type of prior art as described by Hickman is a rotary distillation apparatus which transfers energy from the condensing to the evaporating surfaces by means of a compressor to condense vapor "at a sufficiently high temperature above that at which it is evolved". This apparatus requires an expenditure of energy to operate the compressor.

SUMMARY OF THE INVENTION

According to the present invention, a substantially adiabatic distillation apparatus is provided which comprises a rotatable inner distiller and an outer stationary collection assembly. The distiller has a plurality of distillation chambers formed by stacked disks interspersed by inner and outer spacer rings. Each disk has an evaporating surface on side 1 or the top of the disk, and a condensing surface on side 2 or the bottom of the disk. The distiller has a central feed portion which controls flow of liquid feed into the distillation chambers and an outer distribution portion which controls flow of residue from the surface of side 1 and distillate from the surface of side 2 of each disk into separate channels in the outer collection assembly. The disks have pairs of opposite surfaces including a first relatively smooth, evaporating surface on side 1 and a second grooved, condensing surface on side 2 having a plurality of grooved passageways.

Liquid feed enters the distillation chambers from the central feed portion and spreads as a thin film across the evaporating surfaces of each of the disks. During a start-up period, the liquid feed will heat the apparatus to a desired operating temperature and the liquid will evaporate until a saturated vapor pressure is attained in the distillation chambers. After attainment of vapor saturation, a dynamic equilibrium will be established between liquid and vapor.

The plurality of grooved passageways causes capillary condensation on side 2, so that the saturated vapor preferentially condenses on side 2 and preferentially vaporizes from the liquid on side 1. Rapid heat transfer from the condensing to the evaporating sides of the disks will maintain the temperature of the condensing surfaces equal to or slightly greater than the temperature of the evaporating surfaces. Centrifugal force will remove the condensed vapor from the grooved passageways and maintain the capillary action of the grooves. The result is that the amount of energy for distiller operation is minimized since no external heating for vaporization nor cooling for condensation is required.

The foregoing and other objects, features and advantages will be apparent from the following description of the preferred embodiment of the invention as illustrated in the accompanying drawings.

DESCRIPTION OF THE PREFERRED EMBODIMENT

Figure 1:
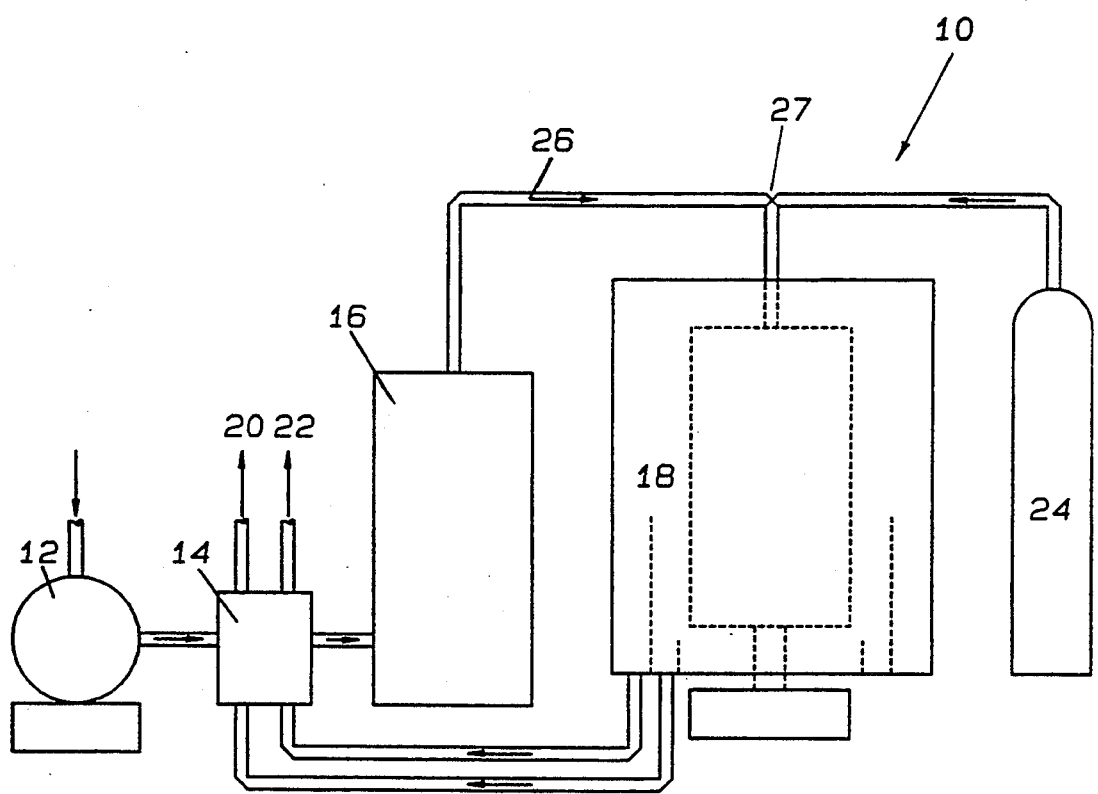
FIG. 1 is a schematic view of a distillation system according to the invention.

As shown in FIG. 1, distillation system 10 is provided. System 10 has a pump 12, which is connected to the heat exchanger 14, and a centrifugal distillation apparatus 18. Apparatus 18 receives a liquid 26 at the top thereof. Apparatus 18 outputs a residue 20 and a distillate 22 at the bottom thereof. Apparatus 18 is connected to a pressurized tank 24 for the optional supply of inert gas thereto by means of valve 27.

Figure 2:
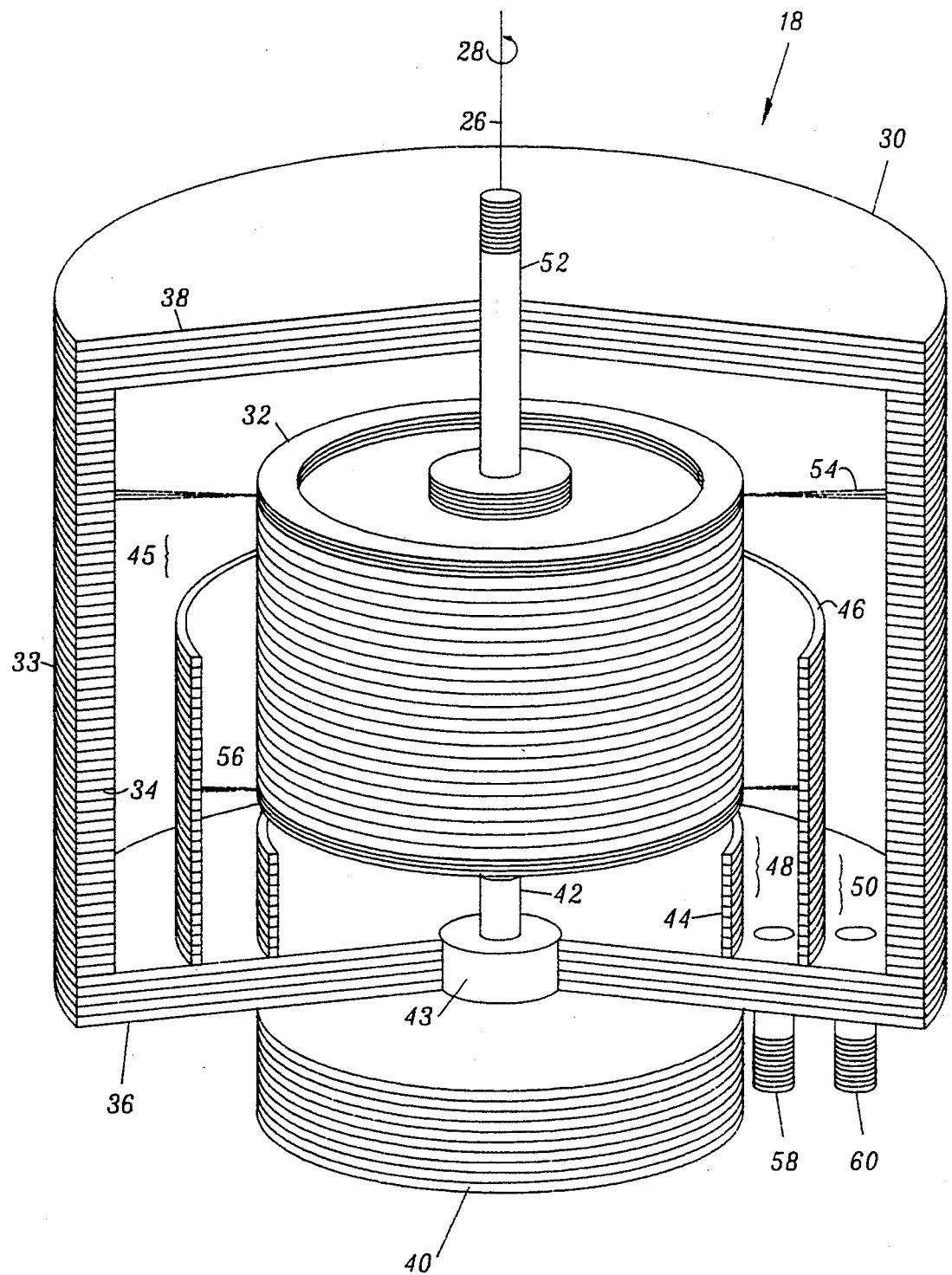
FIG. 2 is a cutaway perspective view of the distillation apparatus portion of the system of FIG. 1.

As shown in FIG. 2, apparatus 18 has a vertical axis 28, a stationary outer collection assembly or collector 30, and an inner rotatable coaxial distillation assembly or distiller 32.

Collection assembly 30 includes a container 33 having a peripheral wall 34, and a pair of coaxial end walls 36, 38, which are fixedly connected to wall 34, and a support stand 40, which supports assembly 32 for rotation relative thereto. Support stand 40 has a variable speed motor (not shown). Motor (not shown) has a drive shaft 42, which rotates distillation assembly 32 relative to collection assembly 30. Shaft 42 rotates relative to wall 36 and housing 43. Walls 34, 36, 38 form the insulated container 33, and enclose a cavity 45.

Lower wall 36 has an inner partition wall 44 and an outer partition wall 46, which are coaxial about axis 28. Walls 44 and 46 form an inner residue channel 48 therebetween. Walls 46 and 34 form an outer distillate channel 50 therebetween.

Upper wall 38 has a feed or inlet tube 52, which is fixedly connected thereto. Liquid 26 enters feed tube 52. A distillate spray 54 leaves distillation assembly 32 at the upper part thereof and collects in outer channel 50. A residue spray 56 leaves distillation assembly 32 at the lower part thereof and collects in inner channel 48. Inner channel 48 has a residue outlet tube 58. Outer channel 50 has a distillate outlet tube 60.

Figure 3:
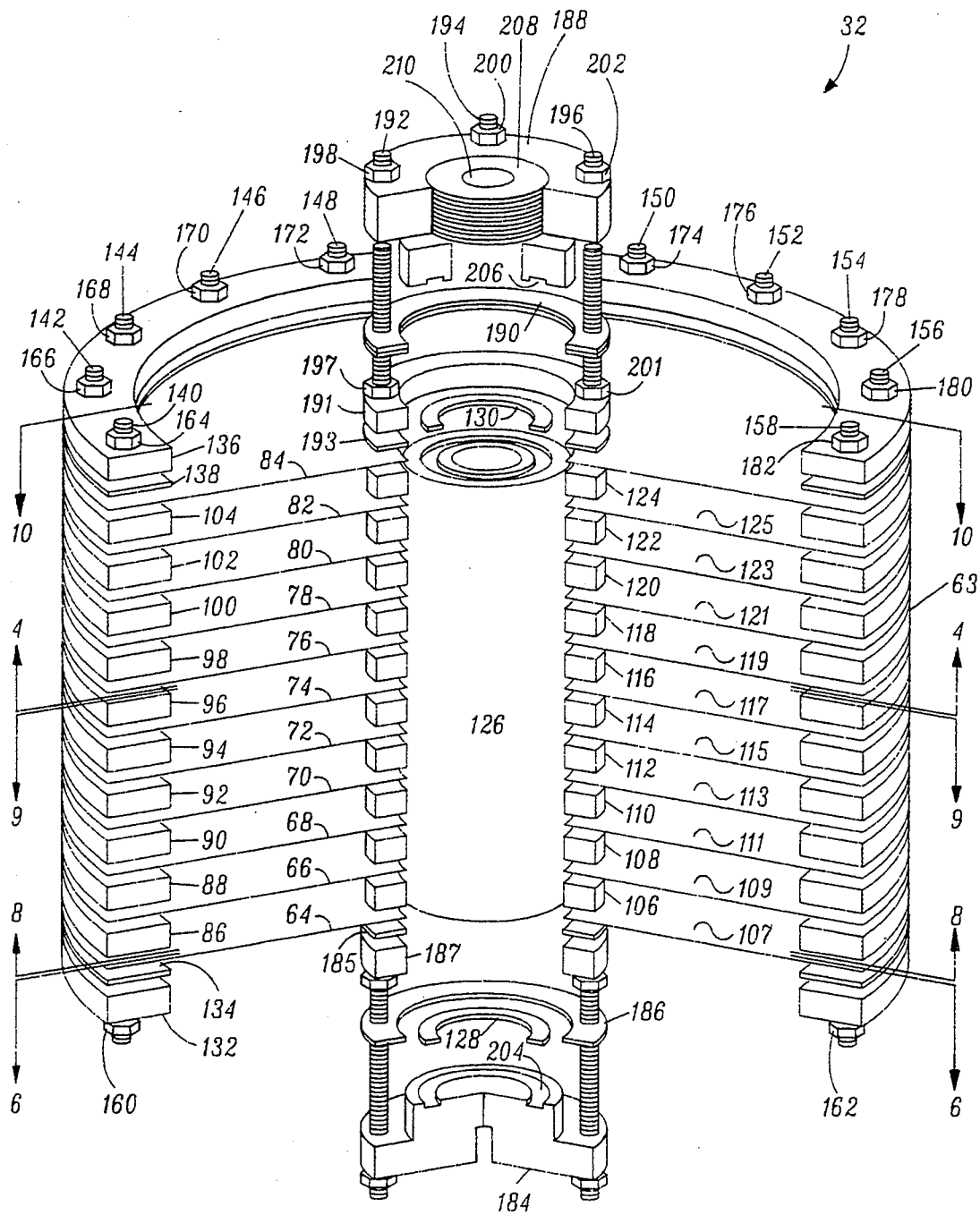
FIG. 3 is an exploded cutaway perspective view of the distiller portion of FIG. 2.

As shown in FIG. 3, distillation assembly 32 has a disk stack 63. Stack 63 has eleven disks 64, 66, 68, 70, 72, 74, 76, 78, 80, 82, 84, and ten outer spacer rings 86, 88, 90, 92, 94, 96, 98, 100, 102, 104, and ten inner spacer rings 106, 108, 110, 112, 114, 116, 118, 120, 122 124, and ten spaces or distillation chambers 107, 109, 111, 113, 115, 117, 119, 121, 123, 125.

Assembly 32 has a flow restrictor 126, which has a bottom restrictor gasket 128, and a top restrictor gasket 130.

Assembly 32 also has a bottom outer support ring 132 with a gasket 134, a top outer support ring 136 with a gasket 138, a plurality of equally spaced rods 140, 142, 144, 146, 148, 150, 152, 154, 156, 158, which have at each end thereof bottom-threaded nuts 160, 162 and top-threaded nuts 164, 166, 168, 170, 172, 174, 176, 178, 180, 182.

Assembly 32 also has a bottom center disk 184 with a gasket 186 and with an inner ring 187 and a gasket 185. Assembly 32 has a top center disk 188 with a gasket 190 and with an inner ring 191 and a gasket 193. Assembly 32 also has plurality of equally spaced rods 192, 194, 196, which have bottom-threaded nuts and top-threaded nuts 197, 201 on inner ring 191 and top-threaded nuts 198, 200, 202 on disk 188.

Bottom center disk 184 is fixedly connected to drive shaft 42. Bottom center disk 184 has an annular groove 204, which receives restrictor gasket 128. Top center disk 188 has annular groove 206 which receives restrictor gasket 130. Top center disk 188 has a rotary seal member 208 for rotation of top center disk 188 relative to feed tube 52. Seal 208 has a hole 210 which receives tube 52.

As shown FIG. 3, disk 64 is substantially identical to disks 66–84. Space 107 is substantially identical to spaces 109–125. Spacer 86 is substantially identical to spacers 88–104. Spacer 106 is substantially identical to spacers 108–124.

Figure 4:
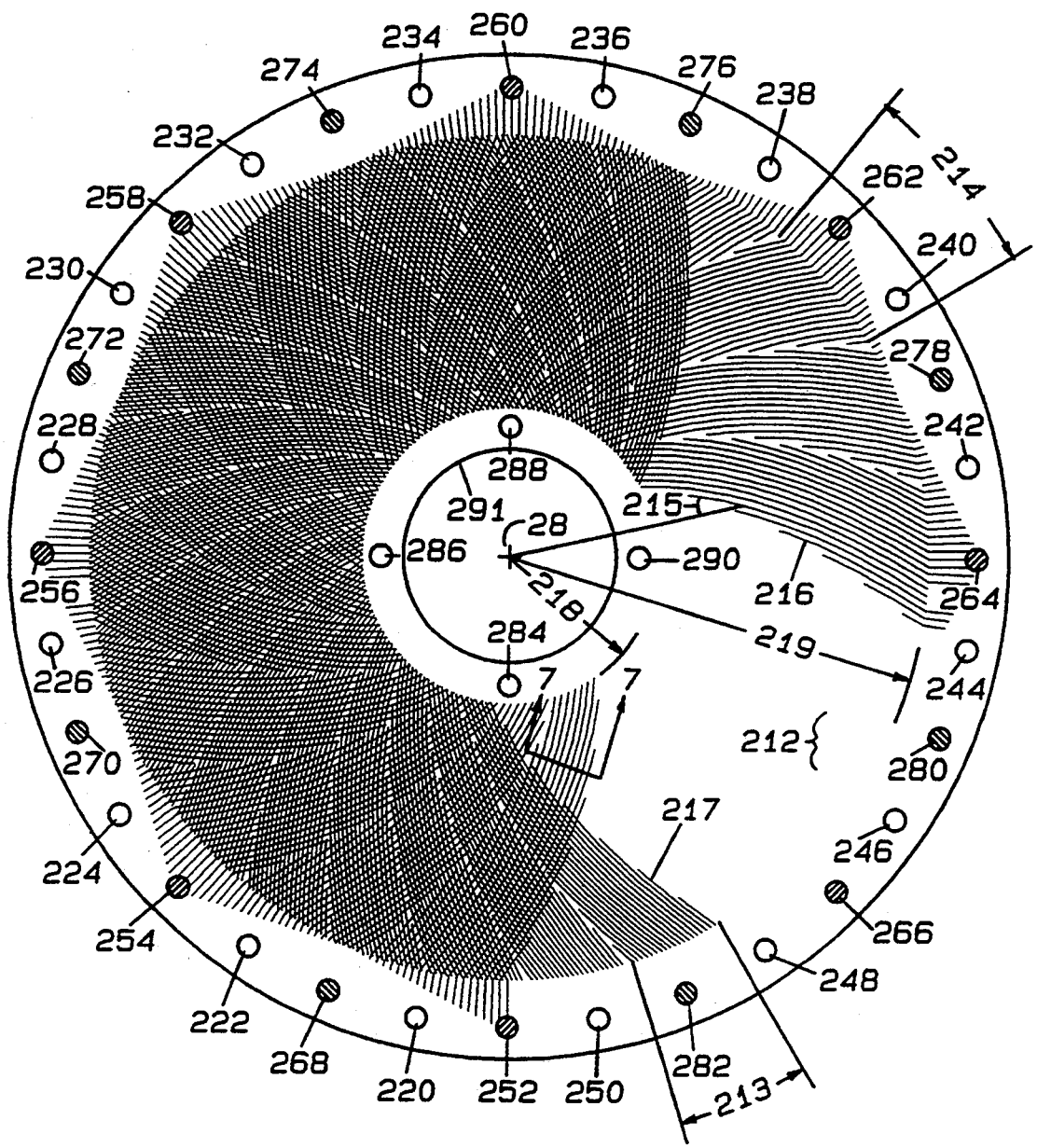
FIG. 4 is a section view as taken along line 4—4 of FIG. 3.

As shown in FIG. 4, side 2 of disk 76, which is a typical disk, has a condensing surface 212. Surface 212 has two series of radially oriented etched grooves 216 and 217. Grooves 216 intersect a radius at a relatively constant angle 215. Grooves 216 and 217 are curved in opposite directions with respect to a radius so that grooves 216 and 217 intersect at an angle approximately two times that of angle 215. Grooves 216 are divided into a number of sections 214, each having a plurality of similar curved, etched grooves which are oriented generally radially outward. Similarly, grooves 217 are divided into a number of sections 213, each having a number of similar curved, etched grooves which are oriented generally radially outward. The grooves in section 216 are parallel and equally spaced as are the grooves in section 217. Condensing surface 212 has inner radius 218 at the radially inner ends of the grooves and outer radius 219 at the change in angle of the grooves. Disk 76 has thirty two holes, spaced at equal angles, which include sixteen rod holes 220, 222, 224, 226, 228, 230, 232, 234, 236, 238, 240, 242, 244, 246, 248, 250, and which include eight distillate holes 252, 254, 256, 258, 260, 262, 264, 266, and which include eight residue holes 268, 270, 272, 274, 276, 278, 280, 282. Disk 76 also has four radially inner rod holes 284, 286, 288, 290. Disk 76 also has an inner opening or hole 291. Etched grooves 216 become radially oriented at radius 219 and terminate in an 8-pointed star-shaped perimeter.

Figure 5:
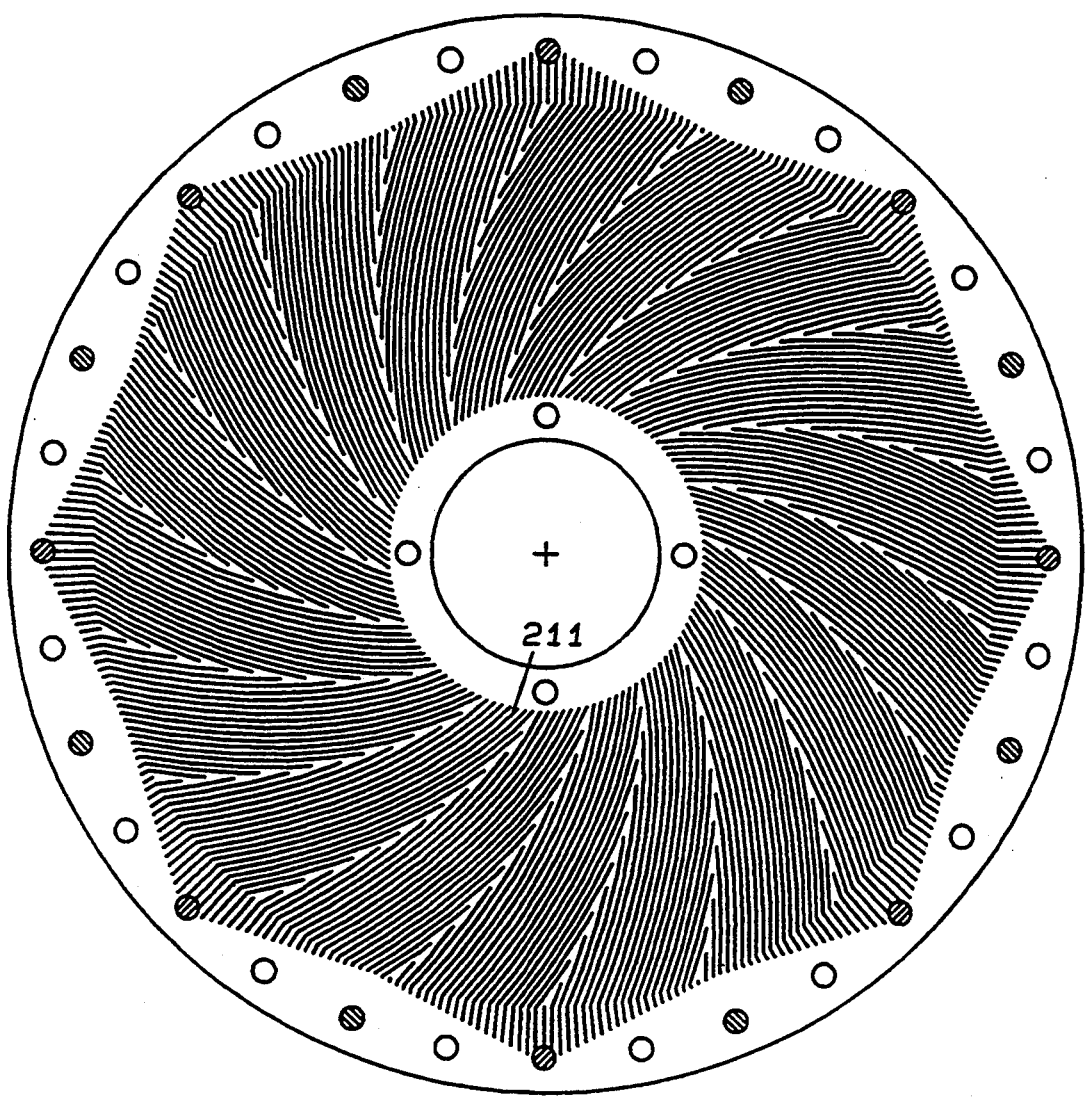
FIG. 5 is a section view as taken along line 5—5 of FIG. 7.

As shown in FIG. 5, disk 76 has a middle layer comprised of a plurality of curved, etched grooves 211 which are identical in number and orientation to grooves 216 on the condensing surface of side 2 in FIG. 4. The grooves in the middle layer are broader than those of the condensing surface.

Figure 6:
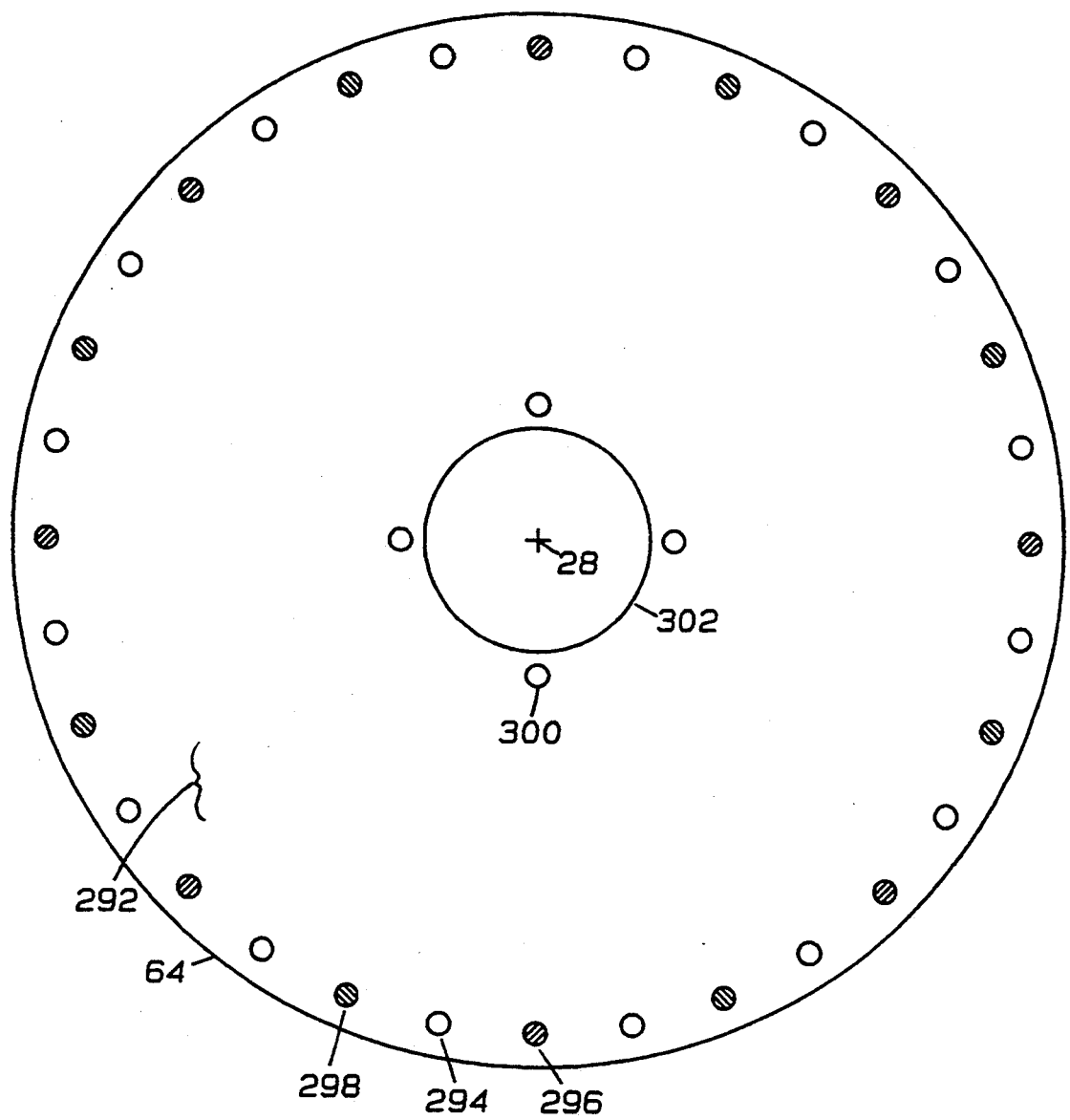
FIG. 6 is a section view as taken along line 6—6 of FIG. 3.

As shown in FIG. 6, disk 64 has an evaporation surface 292 on side 1. The outer holes include sixteen rod holes 294, eight distillate holes 296, and eight residue holes 298. Surface 292 is a relatively flat, plain surface, without any grooves. There are four inner rod holes 300. There is also an inner opening or hole 302.

Figure 7:
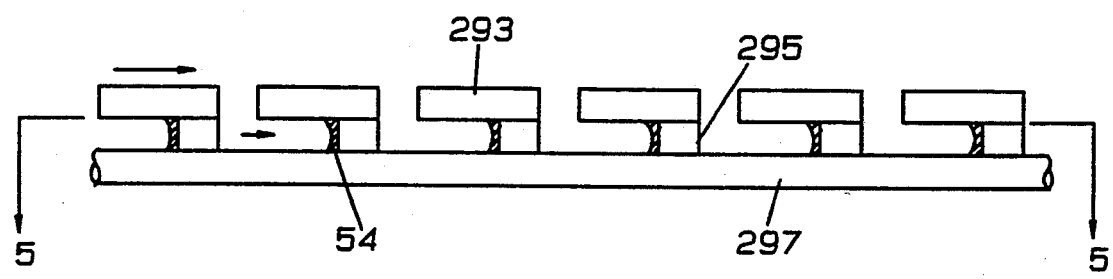
FIG. 7 is a cross section view is taken along line 7—7 of FIG. 4.

The three disk layers are comprised of two or three individual disks which have been laminated to form a single disk. As shown in FIG. 7, a cross section of the individual disks 293, 295, and 297 formed by stacking the respective disks shown in FIG. 4, FIG. 5, and FIG. 6 shows that the alignment of grooves 216 from the condensing surface 212 with grooves 211 from the middle layer results in grooves which are L-shaped in cross section such that the grooves are wider in the middle than at the surface. Grooves 217 as shown in FIG. 4 are partially etched into the top layer and do not extend into the middle layer.

Figure 8:
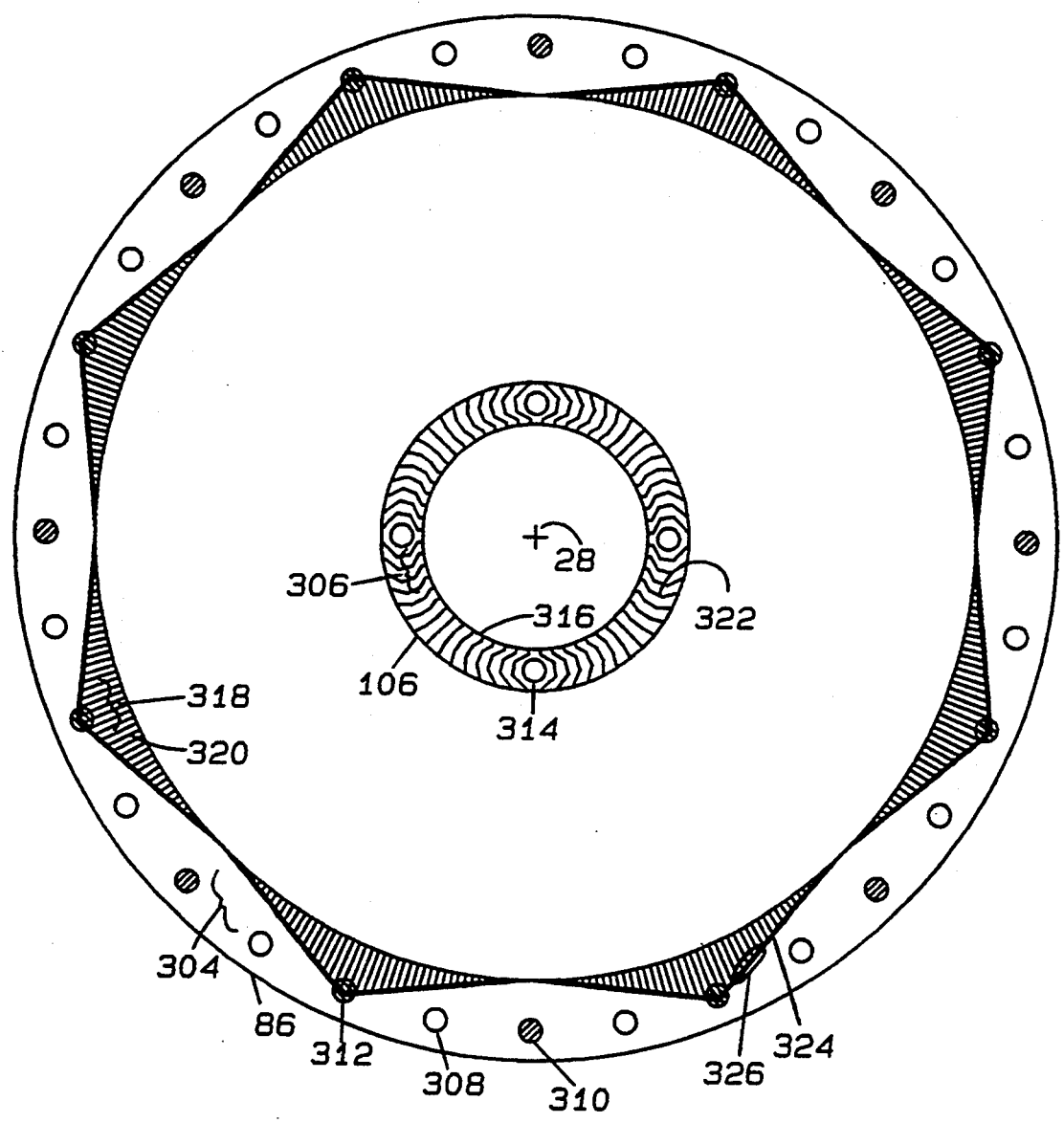
FIG. 8 is a section view as taken along line 8—8 of FIG. 3.

As shown in FIG. 8, outer spacer 86 has surface 304 on side 2; and inner spacer 106 has surface 306 on side 2. The holes in spacers 86 and 106 have the size and spacing and number as the corresponding holes in disk 66. The holes are symmetrical in arrangement, about perpendicular axes, normal to axis 28.

Outer holes include sixteen rod holes 308, eight distillate holes 310, and eight residue holes 312. Inner holes include four rod holes 314. There is an inner opening or hole 316, which is the same size as corresponding holes 291 and 302. Outer surface 304 has eight sections 318, which have a plurality of radial grooves 320. Inner surface 306 has a plurality of peripherally-spaced, substantially radial, feed grooves 322. Groove sections 318 have an eight-pointed perimeter 324. Perimeter 324 has sixteen V-shaped grooves 326. Grooves 326 empty into residue holes 312, located between each pair of V-shaped grooves 326.

Figure 9:
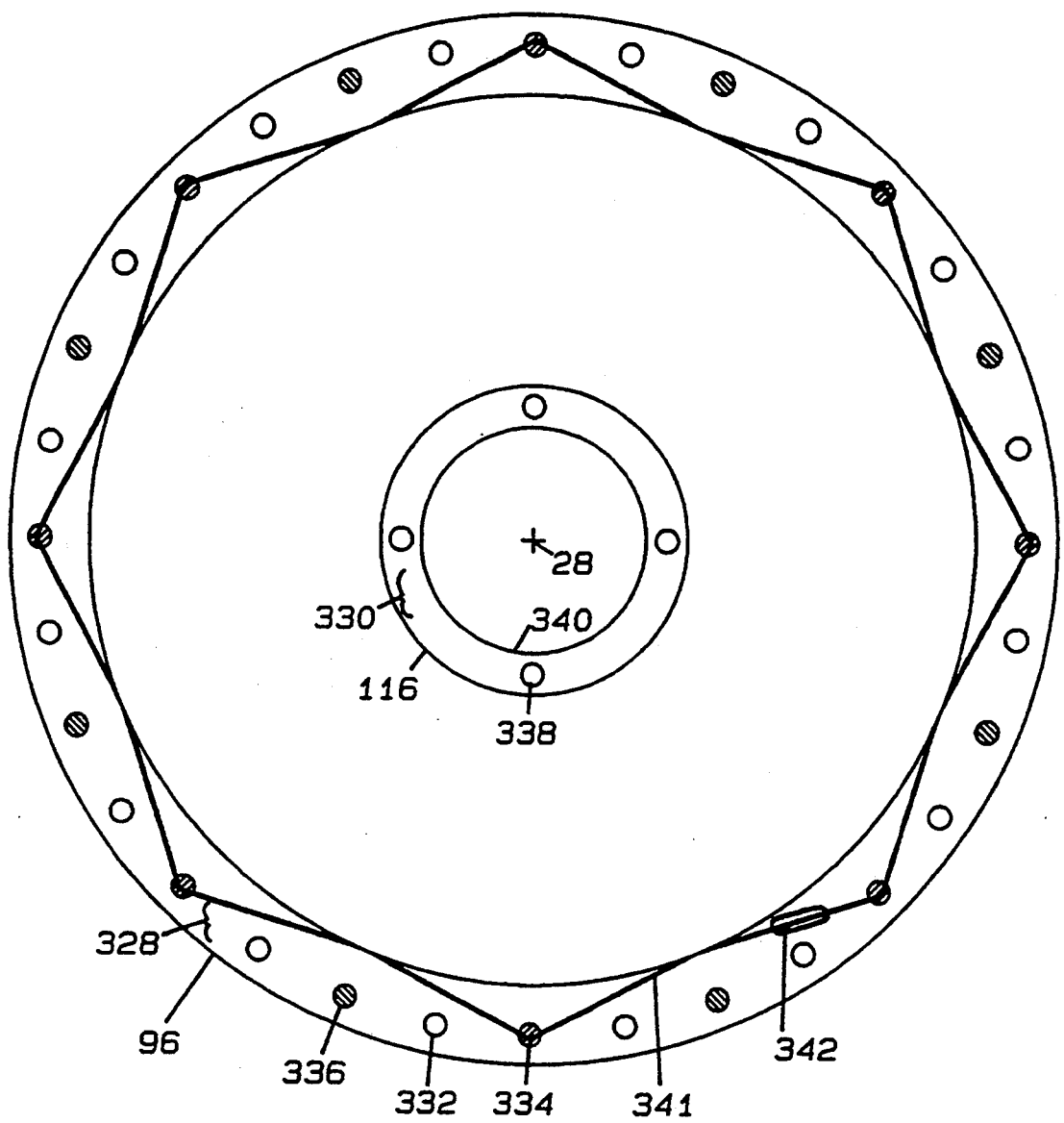
FIG. 9 is a section view as taken along line 9—9 of FIG. 3.

As shown in FIG. 9, outer spacer ring 96 has an outer surface 328 on side 1 and inner spacer ring 116 has an inner surface 330 on side 1. The holes in the spacer ring have the same size and spacing and number as the corresponding holes in disk 76. Outer holes include sixteen rod holes 332, eight distillate holes 334, and eight residue holes 336. Inner holes include four rod holes 338. Inner ring 116 has an opening 340. Outer ring surface 328 has a V-shaped groove 342, forming an eight-pointed, star-shaped perimeter, 341, which runs into the eight distillate holes 334 at its outer points. Inner ring surface 330 is a flat, plain surface, without grooves. Inner ring opening 340 has a size which is about the same size as openings 291, 302, 316.

Figure 10:
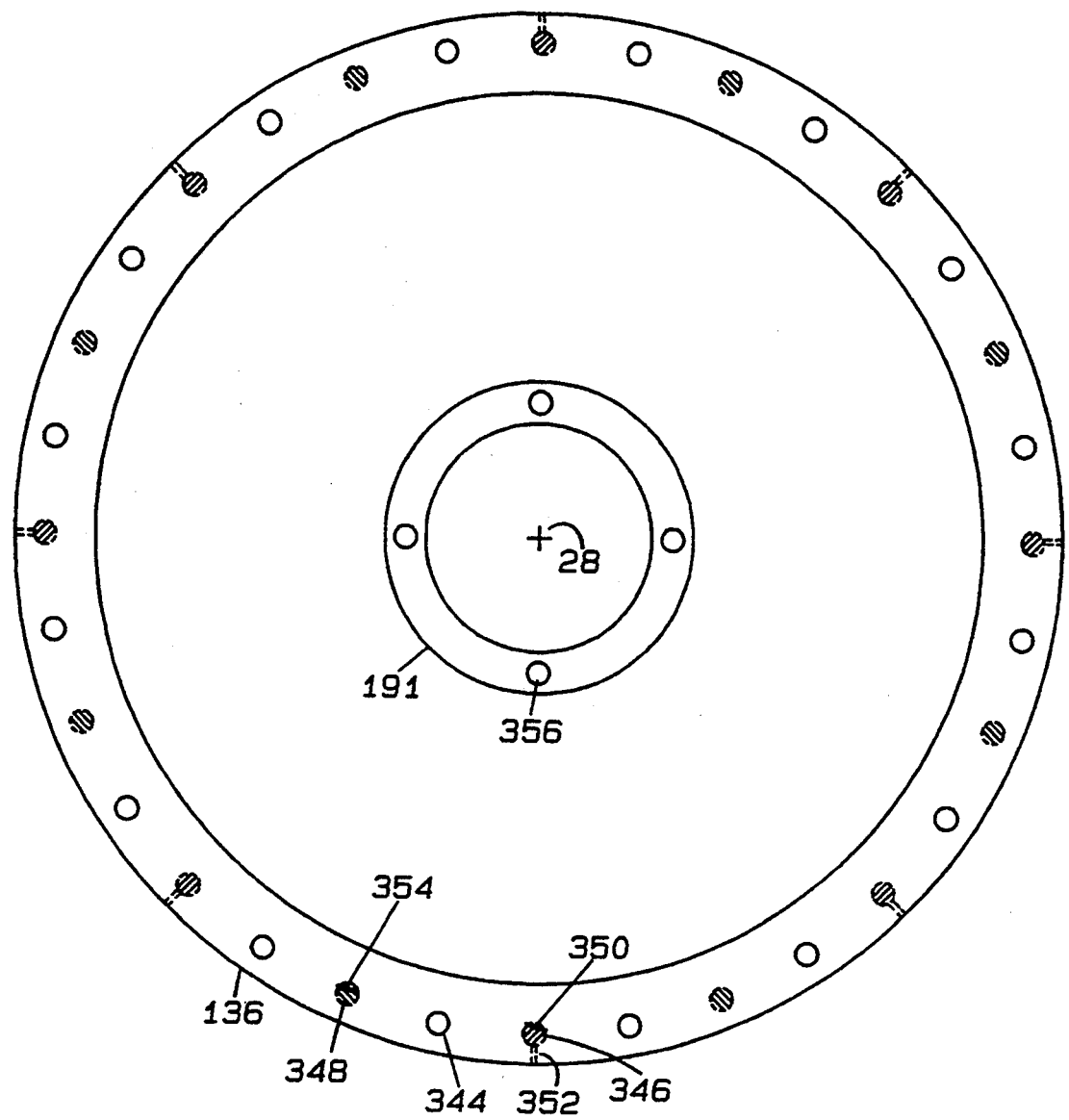
FIG. 10 is a section view as taken along line 10—10 of FIG. 3.

As shown in FIG. 10, top outer support ring 136 has sixteen rod holes 344, and eight distillate holes 346, which are blind or recessed holes. Ring 136 also has eight residue holes 348, which are blind recessed holes. Holes 346 line up with disk and spacer holes 334, 310, 296, 252 forming eight distillate channels 350. Top ring 136 has eight peripherally-spaced, distillate exit holes 352 connecting to channels 350. Ring 136 closes the tops of the channels 350 of distillate holes 346, 334, 310, 296, 252. Ring 136 also closes the tops of residue channels 354 formed by residue holes 348, 336, 312, 298, 268. Inner ring 191 has four inner rod holes 356.

As shown in FIG. 2, distillate exit holes 352, each has the distillate spray 54, which is collected in passage 50 for exit through tube 60. Bottom ring 132 also has exit holes (not shown) connecting to residue channels 354. Residue exit holes (not shown), each has the residue spray 56, which is collected in passage 48 for exit through tube 58.

In operation, FIG. 1 shows the schematic representation of the separation process. The liquid 26 to be separated is optionally preheated prior to entering the centrifugal distillation apparatus 18. This is done by using a pump 12 to pass the liquid through a heat exchanger 14 which thermally contacts the liquid 26 entering the exchanger with the distillate 22 and residue 20 exiting the apparatus 18. In order to compensate for incomplete heat exchange and to compensate for heat loss from the thermally insulated container 33, the liquid is then further heated to a desired temperature by passing through a supplemental heater 16. This heater is the only heating source necessary for operation of distillation system 10. After heating, the liquid is fed into the distillation apparatus 18 at the top. After separation, the liquid exits the apparatus as residue 20 and distillate 22. If it is desired to maintain an inert atmosphere inside the distillation apparatus, an inert gas is entered from a pressurized tank 24.

FIG. 2 shows the overall representation of the distillation apparatus 18. Liquid 26 is fed into the distiller 32 at the center through a feed tube 52 at the top. During passage through the distiller the liquid separates into residue and distillate and exits the distiller in streams of residue 56 and distillate 54. The residue collects in one channel 48 surrounding the distiller and the distillate in another channel 50. The entire distiller is rotated by means of a motor (not shown) affixed to the bottom which is equipped with a variable speed drive. The motor is housed in support stand 40. The distiller 32 is surrounded by thermally insulated container 33 which adiabatically isolates the distillation apparatus.

FIG. 3 shows a detailed cutaway representation of the distiller 32 or rotating portion of the distillation apparatus 18. The distiller 32 is comprised of a plurality of metallic disks 64–84 which are interspersed by inner spacer rings 106–124 and outer spacer rings 86–104. The number of disks can vary, however a total from 10 to 250 would be generally suitable. The diameter of the disks can vary but a diameter from 10 to 36 inches is generally suitable. The thickness of the spacer disks can also vary but a thickness from 0.05 to 0.5 inches is generally suitable. The entire disk stack is held together by a series of rods 140–158 and 192–196 which go through both the spacer rings and disks at both the inner and outer diameters. A series of nuts 197 and 201, 164–182 and 160–162 are used to tighten the rods to inner support rings 187, 191 and outer support rings 132, 136 located at the top and bottom. Inner and outer support gaskets 185, 193, 134, 138 separate the support rings from the top and bottom disks. Top center disk 188 and gasket 190 fit over the upper support ring 191 and is affixed to the ring by tightening nuts 198, 200, 202 to the top of the rods located above the inner support ring. The top center disk has a hole in the center into which rotary seal 208 is fit. The liquid 26 is fed into the apparatus 18 via a feed tube as shown in FIG. 2 which fits into this seal 208. Bottom center disk 184 and gasket 186 fit under the lower support ring 187 and is similarly tightened to the ring using the lower portion of the rods. The bottom center disk 184 is affixed to shaft 42 from the motor (not shown). At the inner diameter of the distiller 32 is a flow restrictor cartridge 126 which is located between the lower and upper center disks 184, 188. At the upper and lower ends of the cartridge 126 are gaskets 130, 128 which maintain a tight seal between the cartridge 126 and the center disks. The gaskets 128, 130 fit into circular grooves 204, 206 located at both ends of the flow restrictor 126 and in the top and bottom center disks 184, 188. The construction parameters of the flow restrictor cartridge 126 can vary, however it has been found that a sintered metal filter cartridge with a diameter of 2.5 to 2.75 inches and a length of 10 to 20 inches is generally suitable.

A necessary prerequisite for distillation is that there be some difference between the evaporating and condensing surfaces so that there is a mass transfer from the evaporating to the condensing surface. In the case of ordinary distillation, there is a temperature difference such that the condensing surface is cooler than the evaporating surface.

According to this invention the pressure is the same at both surfaces and the temperature of the condensing surface is equal to or slightly greater than the temperature at the evaporating surface. In order to cause mass transfer, there is a physical difference between the disk surfaces which causes capillary condensation to occur on one surface only. It is known that capillary condensation can occur significantly below the saturated vapor pressure. The condensing surface on side 2 as shown in FIG. 4 has a very large number of curved, grooves 216 and 217 which are not on side 1. Grooves 216 are etched through the condensing surface layer of disk 76 and due to alignment with grooves 211 as shown in FIG. 5 are L-shaped in cross section as shown in FIG. 7. Grooves 217 are partially etched into the condensing surface layer and are U-shaped in cross section due to the nature of photochemical etching. Both sets of grooves serve to minimize vaporization from the condensing surfaces of the spinning disks for the following reasons:

a) the capillary action of the grooves will promote capillary condensation of the saturated vapor and slow re-vaporization of the condensate.

b) the grooves are oriented generally radially outward so that centrifugal force will continuously remove liquid from the grooves through outward migration and thus maintain the capillary action of the grooves.

c) the groove dimensions will cause air trapped in the groove to rotate with the disk so that vaporization caused by stationary air passing over the surface is reduced.

d) the grooves which are L-shaped in cross section will minimize vaporization because the liquid will be forced into the grooves which extend laterally underneath the disk surface by centrifugal force and be shielded from the air passing over the surface and causing re-vaporization as shown in FIG. 7 prior to collection as distillate 54.

FIG. 4 shows surface 212 of the metallic disks which has a very large number of curved, generally radial grooves 216 and 217. At the inner diameter of the disks is a number of holes 284, 286, 288, 290 for the inner support rods 192, 194, 196. At the outer perimeter is a series of holes 220–250 for the outer support rods. Alternating with these holes are holes for the distillate 22 and residue 20. As can be seen from FIG. 4, the points of the star-shaped perimeter feed into the holes 252–266 for the distillate.

FIG. 6 shows side 1 of the ring-shaped disks which has a relatively smooth evaporating surface.

In FIG. 4, disk 76 has a number of radial grooves 216 which are produced by means of photochemical etching. It is possible to create grooves which extend laterally under the surface of side 2 by laminating two or three photochemically etched disks such that the middle layer, as shown in FIG. 5, has broader grooves than the surface layer as shown in FIG. 4. Side 1 is created by making a disk with no grooves as shown in FIG. 6. It is possible to produce grooves extending laterally under the disk surfaces with virtually any dimensions of height and width by means of lamination. This enables maximizing the capillary action of these grooves. The width of the grooves on side 2 can vary, however dimensions of 0.003 to 0.010 inches are generally suitable. The width of grooves 211 on the middle layer can also vary, however dimensions from 0.006 to 0.040 inches are generally suitable. The spacing between the grooves can also vary, however dimensions from 0.006 to 0.030 inches are generally suitable. The thickness of the individual disks forming the composite laminate can vary, however a thickness from 0.003 to 0.015 inches is generally suitable. The total thickness of the disks can also vary, however dimensions from 0.009 to 0.030 inches are generally suitable.

Various metals can be used for construction of the disks, however it has been found that metals with good photochemical etching properties coupled with oxidative and chemical stability are preferred. In addition, it is preferable that the metals have good heat transfer properties, have good brazing capabilities and be relatively lightweight. Metals which have been found to be generally suitable are titanium and stainless steel.

A central feed portion is used to control flow of liquid entering the distillation apparatus 18 into the distillation chambers. The control of the flow rate of liquid entering into the distillation apparatus 18 is provided by the combined actions of liquid pressure, centrifugal force and the porosity of a cylindrical flow restrictor located in the middle of the disk stack as shown in of FIG. 3. The liquid pressure can vary, however it is not necessary to operate at high pressure because the flow rate can be changed by changing the porosity of the flow restrictor.

It has been found that operating at a low feed pressure, i.e., less than 10 psi, is generally suitable. The centrifugal force can vary, however a force created by spinning the disk stack 63 from 500 to 3000 rpm is generally suitable. The porosity of the flow restrictor can vary but pore sizes from 0.5 to 5 microns have been found to be generally suitable. The back pressure provided by the narrow pores of the restrictor causes the liquid to fill the entire center of the flow restrictor so that pressure provided by either gravity or an external pump in combination with centrifugal force will cause the liquid to flow through the restrictor evenly at a desired flow rate. This will then distribute the liquid evenly on the inner diameter of the disk stack. It is preferred that the flow restrictor 126 be made from sintered metal in order to provide for high differential pressure capability and multiple re-use.

The flow of liquid into the distillation chambers is controlled by inner spacer rings 106–124 which are located between the metallic disks 64–84 as shown in FIG. 3. FIG. 8 shows surfaces 306 on side 2 of the inner spacer rings which contact side 1 of the disks. Surface 306 of the inner ring 106 contains a number of grooves 322 which channel the liquid around the holes 314 containing the support rods from the inner diameter of the disk stack to the evaporating portion on side 1 of the disks. The grooves are evenly distributed radially at both the inner and outer diameters so that liquid is evenly distributed onto the evaporating surface 292 on side 1 of the disk. FIG. 9 shows side 1 of inner spacer ring 116. Side 1 of the inner ring 116 is smooth so that no feed liquid enters the condensing surface on side 2 of the disk.

An outer distribution portion controls flow of residue from the surface of side 1 and distillate from the surface of side 2 of each disk into separate channels in the outer collection assembly. FIG. 8 shows surface 304 on side 2 of the outer spacer rings 86–104 which contact side 1 of the disks. The inner and outer spacer rings are the same thickness so that the gap between the disks is uniform. Side 2 of the outer spacer ring contains a number of radial grooves 320 which channel the liquid residue exiting the evaporating surface on side 1 of the disk into several V-shaped grooves 326. The V-shaped grooves 326 in turn feed the liquid residue 20 into a series of holes 312–326 for residue which are also located in the metallic disks as shown FIG. 6. FIG. 9 shows the side 1 of outer spacer ring 96. Side 1 of the outer ring 96 contains V-shaped grooves 342 which align with the ends of the etched grooves located on side 2 of the disks which forces the distillate into a series of holes for distillate 334. The stacking of disks and spacer rings with aligned holes creates a number of vertical channels 350, 354 as shown in FIG. 10. The result is that one set of vertical channels 350 contains the distillate and an alternating set of vertical channels 354 contains the residue. The vertical channels 354, 350 containing residue and distillate alternate with holes in the rings and disks containing support rods. In order to maintain separation of residue and distillate upon exiting the disk stack, the channels 350 containing the distillate have exit holes 352 located at the top of the disk stack and the channels 354 containing the residue have exit holes (not shown) located at the bottom of the disk stack. As a result, the distillate and residue exit the spinning disk stack at different heights as shown in FIG. 2.

FIG. 10 shows the inner and outer top support rings. Holes for the support rods are drilled through the inner and outer support rings 191, 136. Blind or recessed holes for residue and distillate are drilled partially into the top outer support ring from the bottom to create a top for the residue and distillate channels. The distillate exits as a spray from small holes 352 drilled from the outside diameter into the distillate channels. The residue exits from equivalent holes (not shown) drilled into the bottom outer support ring 132.

It is preferable to control the liquid flow through the interface between the inner and outer spacer rings and the disk surfaces by means of grooves 320, 322, 326, 342 in the spacer rings rather than in the metallic disks. In this way the thickness of the disks can be minimized and the strength maximized. The width and depth of the grooves in the spacer rings can vary, but widths from 0.010 to 0.050 inches and depths from 0.010 to 0.050 inches are generally suitable.

The invention involves a system 10 and a continuous process whereby a liquid 26 is introduced into an enclosed separation apparatus 18 of generally cylindrical design. The apparatus 18 includes a stack 63 of parallel disks 64-84 which are separated from each other by a small gap 107-125. The liquid 26 to be separated is introduced into the disk stack 63 at the center and is applied to only one surface 292 on side 1 of each of the disks at the inner diameter. The entire disk stack is rotated which causes the liquid to continuously migrate from the inner diameter to the outer diameter of each of the disks. During migration, a portion of the liquid will vaporize from side 1 of each disk and condense on side 2 of a neighboring disk. At the perimeter of the disk stack 63 the liquid from side 1 (the less volatile fraction) is collected into one series of residue channels 354 and the liquid from side 2 of the disk surfaces (the more volatile fraction) is collected into another series of distillate channels 350. Each series of channels eventually feeds into separate collection vessels for the residue and distillate.

The advantages of system 10 and apparatus 18 are indicated hereafter.

A. The system 10 is designed to minimize the energy requirement for distillation such that the only energy requirements are for a pump to feed the apparatus 18, a supplemental heater to heat the liquid to a desired temperature, and a motor (not shown) to rotate the disk stack. Consideration of these energy requirements as energy supply into apparatus 18 theoretically makes operation of the apparatus 18 substantially, rather than totally, adiabatic. All the energy needed for distillation is provided by means of heat transfer from the condensing to the evaporating surface of the disk. Heat transfer occurs by means of both conduction and convection. Conduction is enhanced because the disks are made of a thin metal and convection is enhanced because the disks are spinning. The direct contact of the thin, spinning metallic disks with the air surrounding the distiller in cavity 45 enables heat transfer from the condensing surface of disk 84, the top disk in distiller, to the evaporating surface of disk 64, the bottom disk in the distiller, to occur indirectly by means of heat exchange between the two disk surfaces and air of relatively constant temperature circulating within the insulated container 33.

B. The rotational speed of the distiller can be used as a parameter to enhance distillation. Increasing the speed of rotation will increase the rate of distillation because the rate of phase transfer between liquid and vapor phases increases. This enables distillation to occur at a temperature significantly lower than that of boiling. The benefits are that energy consumption is reduced because the liquid 26 enters at a lower temperature, less corrosion of the metallic surfaces occurs, and thermally unstable components can be distilled at lower temperatures.

C. This invention provides that a liquid 26 enter the distillation apparatus 18 at a temperature sufficient to achieve distillation and that the liquid exit the apparatus at approximately the same temperature in separate residue stream 20 and distillate stream 22. This invention provides that no heating or cooling be needed during distillation because all the energy necessary for liquid evaporation is provided by the energy released by vapor condensation. The invention provides a continuous process for separation which is applicable to the separation of a volatile liquid from non-volatile dissolved solids as well as to the separation of liquids having differences in volatility. The apparatus is applicable to single-stage separations as well as to multiple-stage separations where several separations steps are necessary.

The invention has been described such that the supplemental heater is external to the centrifugal distillation apparatus 18, however, it is apparent that this heater could be located within the apparatus. The invention has been described such that the axis of rotation is vertical, however it is apparent that the axis orientation could equivalently be horizontal if modifications are made in the means of collection. In addition, the invention has been described such that the residue exits from the bottom and the distillate from the top of the distiller, however, it is apparent that the residue could exit from the top and the distillate from the bottom of the distiller. In addition, while the apparatus has been described with usage of a rotary seal, it is apparent that other means of introducing liquid into the central feed portion would be suitable. In addition, while the plurality of disks in the invention has been described with the condensing surface on side 2 having a very large number of curved grooves which are not on side 1, it is apparent that any physical or chemical differences between sides 1 and 2 which cause side 1 to be much more susceptible to vaporization than side 2 would be suitable.

While the invention has been described in its preferred embodiment, it is to be understood that the words which have been used are words of description rather than limitation and that changes may be made within the purview of the appended claims without departing from the true scope and spirit of the invention in its broader aspects.

What is claimed:

1. A substantially adiabatic, centrifugal distillation apparatus comprising a rotatable inner distiller and an outer stationary collection assembly, said distiller having a plurality of distillation chambers formed by stacked disks interspersed by inner and outer spacer rings, said disks each having an upper side and a lower side, said upper side being relatively smooth and being an evaporating surface and said lower side having a large number of centrally radially oriented etched grooves and being a condensing surface, said distiller having a central feed portion which controls flow of liquid feed onto the upper side of each of said disks forming the distillation chambers and an outer distribution portion which controls flow of residue from the surface of the upper side of each disk and the flow of distillate from the lower surface of each disk into separate channels in the outer collection assembly.

2. The apparatus of claim 1, wherein the central feed portion applies liquid feed equally and simultaneously onto a plurality of disks and which is comprised of: a bottom inner support ring and gasket, a top inner support ring and gasket, a bottom center disk; a top center disk; said inner spacer rings alternately disposed between said plurality of disks; said inner spacer rings having conduits for fluid flow onto the evaporating surfaces of the disks; a flow restrictor coaxially disposed between the center disks; and a plurality of rods extending through rod holes in the top and bottom inner support rings and gaskets, and through holes in the inner spacer rings and disks, and through holes in the top and bottom center disks.

3. The apparatus of claim 1, wherein said outer distribution portion collects residue from the upper side of each disk and sprays said collected residue from the top of the distiller and which collects distillate from the lower side of each disk and sprays said collected distillate from the bottom of the distiller, said outer distribution portion comprising: a bottom outer support ring and associated gasket; a top outer support ring and associated gasket; the outer spacer rings alternately disposed between said disks; rod holes in the top and bottom outer support rings, a plurality of rods extending through the rod holes in the top and bottom outer support rings and gaskets and the outer spacer rings and disks; a plurality of distillate channels which alternate around the perimeter of the distiller with a plurality of residue channels with both channels extending from the top outer support ring to the bottom outer support ring; a plurality of peripherally spaced exit holes in the top outer support ring extending radially outwardly from the respective distillate channels and connecting thereto; and a plurality of peripherally spaced exit holes in the bottom outer support ring extending radially outwardly from the respective residue channels and connecting thereto.

4. The apparatus of claim 1 wherein the outer distribution portion collects the distillate from the radial grooves on the lower side of the disk surfaces, with said radial grooves terminating in a star-shaped pattern and which empty the distillate into an aligning star-shaped groove on the surface of the outer spacer ring adjacent to the lower side, with said star-shaped groove emptying the distillate into a plurality of distillate channels at the perimeter of the distiller.

5. The apparatus of claim 1, wherein the outer distribution portion collects the residue from the upper side of the disks into a plurality of radial grooves on the surface of an outer spacer ring adjacent to the upper side, with said radial grooves terminating in a star-shaped groove which collects the residue from the radial grooves on the outer spacer ring and empties the residue into a plurality of residue channels at the perimeter of the distiller.

6. The apparatus of claim 1, wherein the central feed portion includes a flow restrictor comprised of a sintered metal cartridge.

7. The apparatus according to claim 1 wherein said distiller comprises: a bottom outer support ring and associated gasket; a top outer support ring and associated gasket; a plurality of rod holes in the top and bottom support rings which align with holes in the disks and the outer spacer rings; a plurality of rods extending through the rod holes, a plurality of distillate channels which alternate around the perimeter of the distiller with a plurality of residue channels with both channels extending from the top outer support ring to the bottom outer support ring; a plurality of peripherally spaced exit holes extending radially outwardly from the respective distillate channels and connecting thereto; and a plurality of peripherally spaced exit holes extending radially outwardly from the respective residue channels and connecting thereto, whereby the radial oriented etched grooves on the lower surface of the disks terminates in a star-shaped pattern and empties the distillate into an aligning star-shaped groove on the upper surface of the outer spacer ring which in turn empties into the distillate channels.

8. A substantially adiabatic, centrifugal distillation apparatus comprising a rotatable inner distiller and an outer stationary collection assembly, said distiller having a plurality of distillation chambers formed by stacked disks interspersed by inner and outer spacer rings, said disks each having an upper side and a lower side, an evaporating surface on the upper side of each disk and a condensing surface on the lower side of each disk, said distiller having a central feed portion which controls flow of liquid feed into the distillation chambers and an outer distribution portion which controls flow of residue from the surface of the upper side of each disk and distillate from the lower side of each disk into separate channels in the outer stationary collection assembly, wherein the evaporating surface of each of the disks is relatively smooth and the condensing surface of each disk has a large number of generally radially oriented etched grooves, and wherein the condensing surfaces of each disk has a large number of channels oriented generally outward but angled with respect to an intersecting radius and which, in cross-section, are L-shaped such that the channels extend laterally under the disk surfaces; and having said etched grooves intersecting said channels.

9. A multiple-effect, centrifugal distillation apparatus which comprises a rotatable inner distiller having a plurality of distillation chambers formed by stacked disks interspersed by inner and outer rings, said disks each having an upper evaporation surface and a lower condensing surface, and an outer stationary collection assembly, said distiller having a central feed portion which controls flow of liquid into the distillation chambers, an outer distribution portion which controls flow of residue and distillate from the evaporating surfaces and the condensing surfaces into separate channels in the outer collection assembly, wherein the evaporating surfaces of said disks are relatively smooth and the condensing surfaces have a large number of generally radially oriented etched grooves, and wherein the condensing surfaces have a large number of channels oriented generally outward but angled with respect to an intersecting radius and which, in cross-section, are L-shaped such that the channels extend laterally under the disk surfaces; and said surfaces also having a large number of surface grooves which intersect said channels.

* * * * *